United States Patent
Terashima et al.

(10) Patent No.: US 12,278,556 B2
(45) Date of Patent: Apr. 15, 2025

(54) CONTROL DEVICE AND POWER CONVERSION DEVICE

(71) Applicant: TMEIC Corporation, Chuo-ku (JP)

(72) Inventors: Daiki Terashima, Tokyo (JP);
Yoshihiro Tawada, Tokyo (JP);
Tomoya Katsukura, Tokyo (JP); Issei Fukasawa, Tokyo (JP)

(73) Assignee: TMEIC Corporation, Chuo-ku (JP)

( * ) Notice: Subject to any disclaimer, the term of this patent is extended or adjusted under 35 U.S.C. 154(b) by 119 days.

(21) Appl. No.: 18/004,607

(22) PCT Filed: Jun. 25, 2021

(86) PCT No.: PCT/JP2021/024231
§ 371 (c)(1),
(2) Date: Jan. 6, 2023

(87) PCT Pub. No.: WO2022/269929
PCT Pub. Date: Dec. 29, 2022

(65) Prior Publication Data
US 2023/0275528 A1    Aug. 31, 2023

(51) Int. Cl.
*H02M 1/32*    (2007.01)
*H02M 1/12*    (2006.01)
*H02M 7/48*    (2007.01)

(52) U.S. Cl.
CPC ............. *H02M 1/32* (2013.01); *H02M 1/126* (2013.01); *H02M 7/48* (2013.01)

(58) Field of Classification Search
CPC .................................. H02M 1/32; H02M 7/48
See application file for complete search history.

(56) References Cited

U.S. PATENT DOCUMENTS 9,488,686 B2 * 11/2016 Bhandarkar ........ H02M 5/4585
2013/0057297 A1 * 3/2013 Cheng ................... H02M 7/539
324/548

(Continued)

FOREIGN PATENT DOCUMENTS

| JP | 2007-116790 A | 5/2007 |
| JP | 2013-42072 A | 2/2013 |
| JP | 2019-158456 A | 9/2019 |

OTHER PUBLICATIONS

International Search Report & Written Opinion issued Sep. 7, 2021 in PCT/JP2021/024231, filed on Jun. 25, 2021, 11 pages (with English Translation).

(Continued)

*Primary Examiner* — Alex Torres-Rivera
(74) *Attorney, Agent, or Firm* — Oblon, McClelland, Maier & Neustadt, L.L.P.

(57) ABSTRACT

A control device is a control device of a power conversion device, and includes a conversion value calculation unit that acquires a current value of a current flowing in an alternating-current capacitor connected to a capacitor circuit in an output circuit on an alternating-current side of an inverter circuit and performs conversion of the current value to obtain a predetermined conversion value, and a failure detection unit that compares the conversion value obtained by the conversion value calculation unit and a predetermined determination value to be used in failure detection to detect a failure of the alternating-current capacitor.

19 Claims, 9 Drawing Sheets

(56) References Cited

U.S. PATENT DOCUMENTS

| | | | | |
|---|---|---|---|---|
| 2013/0128393 A1* | 5/2013 | Gajic | ................... | H02J 3/1828 |
| | | | | 361/15 |
| 2015/0092460 A1* | 4/2015 | Tallam | ................... | G01R 31/64 |
| | | | | 363/44 |
| 2022/0200500 A1* | 6/2022 | Hayasaka | ............... | H02P 27/08 |

OTHER PUBLICATIONS

Japanese Office Action mailed Mar. 19, 2024 in corresponding Japanese Patent Application No. 2023-502659. All references cited were previously filed on a Form PTO-1449 on Jan. 6, 2023, 6 pages.

* cited by examiner

CONTROL DEVICE AND POWER CONVERSION DEVICE

FIELD

The present invention relates to a control device and a power conversion device.

BACKGROUND

Conventionally, there has been known a configuration in which a plurality of capacitors are connected in parallel in order to increase the capacitances of capacitors (see PTL 1, for example). In a power conversion device that performs conversion of direct-current to three-phase alternating-current, a plurality of alternating-current capacitors are also connected in parallel to a filter circuit (capacitor circuit) of each of phases of the three-phase alternating-current circuits, in order to increase the capacitances of the capacities.

CITATION LIST

Patent Literature

[PTL 1] JP 2013-042072 A

SUMMARY

Technical Problem

When some of the plurality of alternating-current capacitors that are connected in parallel have an open failure in such a power conversion device, the voltage waveform is distorted, but conventionally, it has not been able to be detected as a failure during operation, and therefore the power conversion device has continued to operate. Further, when all of the plurality of alternating-current capacitors that are connected in parallel have open failures, a voltage waveform is distorted more than when some of them have open failures, but conventionally, it has not been able to be detected as a failure during operation even in such a case, and the operation of the power conversion device has sometimes been continued.

However, when some of the alternating-current capacitors have open failures, if the failure cannot be detected during operation, the voltage application is concentrated on the normal alternating-current capacitors, so that there is a risk that the failure will spread to the normal alternating-current capacitors. Further, when the failure spreads, and all of the alternating-current capacitors have open failures, if the failure cannot be detected during operation, there is a risk that large harmonics will be allowed to flow out to the system side.

Therefore, the present invention has an object to find a failure of an alternating-current capacitor early and suppress spread of the failure to normal alternating-current capacitors and outflow of harmonics to a system side, when the alternating-current capacitor has an open failure during operation of a power conversion device.

Solution to Problem

A control device according to one aspect of the present invention is a control device of a power conversion device, and includes a conversion value calculation unit that acquires a current value of a current flowing in an alternating-current capacitor connected to a capacitor circuit in an output circuit on an alternating-current side of an inverter circuit and performs conversion of the current value to obtain a predetermined conversion value, and a failure detection unit that compares the conversion value obtained by the conversion value calculation unit and a predetermined determination value to be used in failure detection to detect a failure of the alternating-current capacitor.

The control device according to one aspect may further include a determination value calculation unit that acquires a voltage value of an output voltage of the inverter circuit, and obtains a determination value to be used in failure detection from the voltage value, and the failure detection unit may compare the conversion value obtained by the conversion value calculation unit and the determination value obtained by the determination value calculation unit to detect a failure of the alternating-current capacitor.

Further, in the control device according to one aspect, the output circuit on the alternating-current side may be three-phase alternating-current circuits, and the conversion value may be a first q-axis current value that is obtained by the conversion value calculation unit by performing dq conversion of the current value of each current of each of phases flowing in a plurality of the alternating-current capacitors that are connected in parallel in the capacitor circuit in each of the phases of the three-phase alternating-current circuits, and is a value of a current component of an axis sifted in phase by 90 degrees with respect to a capacitor voltage.

Further, in the control device according to one aspect, the determination value may be a second q-axis current value that is obtained by the determination value calculation unit by using a voltage value of an output voltage of the inverter circuit and a value of a rated conductance of the alternating-current capacitors, and is a value of a current component of an axis that is shifted in phase by 90 degrees with respect to a capacitor voltage.

Further, in the control device according to one aspect, the determination value may be a value that allows an error based on a value multiplied by a predetermined abnormality detection level.

Further, in the control device according to one aspect, the failure detection unit may compare magnitudes of the conversion value and the determination value, and detect a failure of the alternating-current capacitor when the conversion value is smaller than the determination value.

Further, the control device according to one aspect may further include a failure information warning unit that issues failure information to a predetermined upper device when the failure detection unit detects a failure of the alternating-current capacitor.

Further, the control device according to one aspect may further include an operation control unit that gives an operation instruction to perform at least either one operation of stop of the power conversion device or release of an alternating-current switch in the output circuit on the alternating-current side, when the failure detection unit detects a failure of the alternating-current capacitor.

A power conversion device according to one aspect of the present invention includes an inverter circuit that converts a direct-current power supply into an alternating-current power supply, alternating-current capacitors connected to capacitor circuits in respective phases of three-phase alternating-current circuits in the three-phase alternating-current circuits on an alternating-current side of the inverter circuit, current sensors that acquire current values of currents flowing in the alternating-current capacitors of the respective phases, a voltage sensor that acquires a voltage value of an output voltage of the inverter circuit, and the control device according to any one of claim 1 to claim 7, wherein the conversion value calculation unit acquires the current values acquired by the current sensors and obtains the conversion values, and the determination value calculation unit acquires the voltage value acquired by the voltage sensor and obtains the determination value.

In the power conversion device according to one aspect, the current sensors may be provided in the capacitor circuits branched from the three-phase alternating-current circuits.

In the power conversion device according to one aspect, the current sensors may be provided before and after branch points where the three-phase alternating-current circuits branch into the capacitor circuits, in the three-phase alternating-current circuits.

Further, in the power conversion device according to one aspect, a plurality of packages where the alternating-current capacitors are star-connected or delta-connected may be connected in parallel.

A failure detection method for an alternating-current capacitor according to one aspect of the present invention, in a power conversion device including an inverter circuit that converts a direct-current power supply into an alternating-current power supply, alternating-current capacitors connected to capacitor circuits in respective phases of three-phase alternating-current circuits in the three-phase alternating-current circuits on an alternating-current side of the inverter circuit, current sensors that acquire current values of currents flowing in the alternating-current capacitors of the respective phases, and a voltage sensor that acquires a voltage value of an output voltage of the inverter circuit, the failure detection method includes a conversion value calculating step of converting the current values acquired by the current sensors to obtain a predetermined conversion value, and a failure detection step of comparing the conversion value obtained in the conversion value calculation step, and a predetermined determination value to be used in failure detection to detect a failure of the alternating-current capacitors.

Advantageous Effects of Invention

According to the present invention, in the case where the alternating-current capacitor has an open failure during operation of the power conversion device, it is possible to find the failure of the alternating-current capacitor early and suppress spread of the failure to the normal alternating-current capacitors and outflow of harmonics to the system side.

DESCRIPTION OF EMBODIMENTS

Hereinafter, an embodiment of a control device, a power conversion device, and a failure detection method for an alternating-current capacitor according to the present invention will be described with use of the drawings.

One Embodiment

Figure 1:
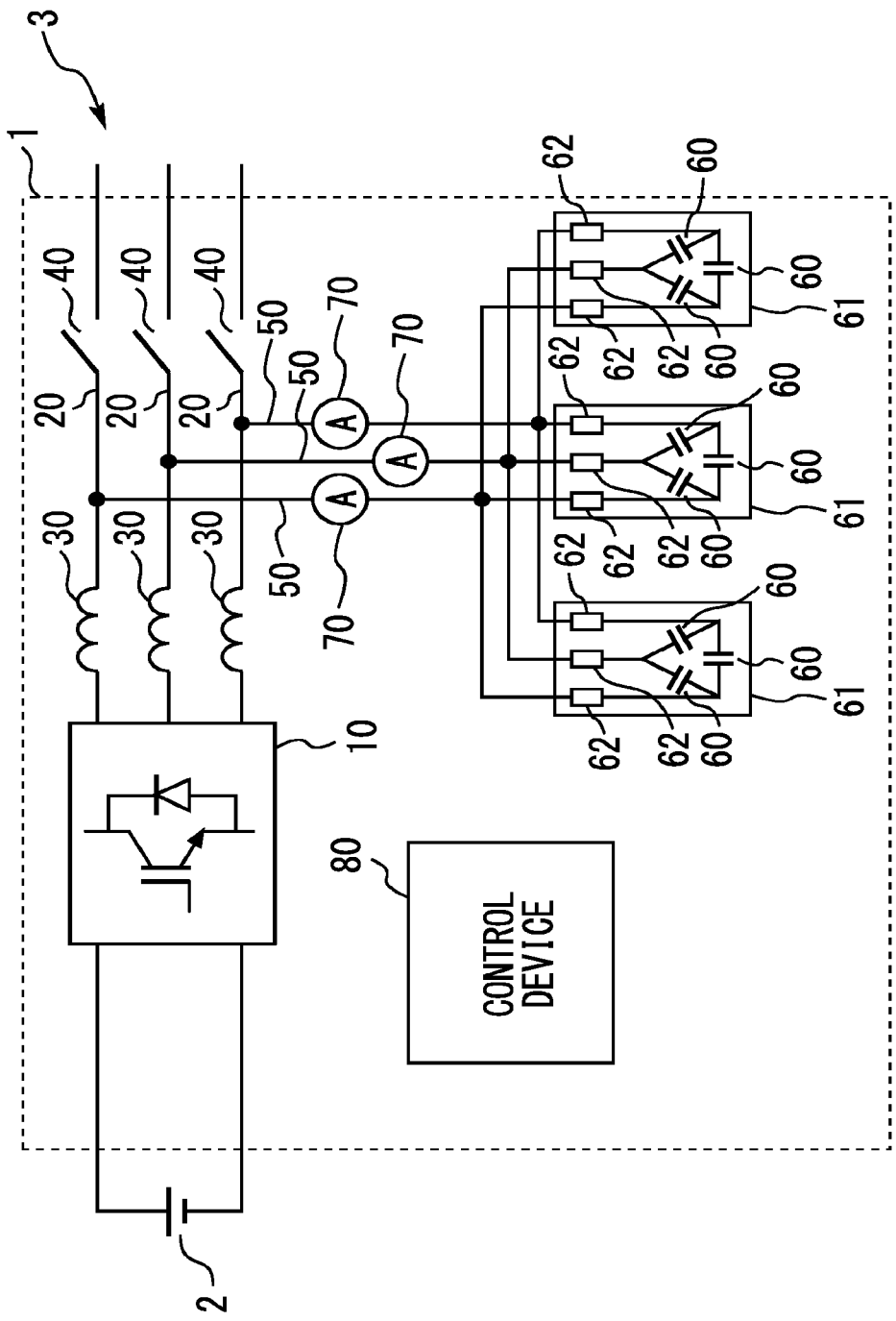
FIG. 1 is a diagram showing one embodiment of a control device, a power conversion device, and a failure detection method for an alternating-current capacitor.

FIG. 1 is a diagram showing one embodiment of a control device, a power conversion device, and a failure detection method for an alternating-current capacitor.

In FIG. 1, a power conversion device 1 is connected to a direct-current power supply 2 at a direct-current end on a left side in FIG. 1 and is connected to an alternating-current power system 3 (Hereinafter, also referred to as a "system 3".) at an alternating-current end on a right side in FIG. 1.

The power conversion device 1 converts a direct-current power supply supplied from the direct-current power supply 2 via a direct-current bus into an alternating-current power supply, and outputs the converted alternating-current power supply to the system 3. Note that the power conversion device 1 is also referred to as a power converter, an inverter unit, a power conditioner, and a power conditioning system (PCS: Power Conditioning Subsystem).

The direct-current power supply 2 may be, for example, a solar cell formed of a solar cell panel, a solar cell module, a solar cell array or the like, may be a storage battery formed of various kinds of secondary batteries, fuel cells or the like, or may include both of them. Note that the direct-current power supply 2 may be a direct-current power supply system formed of an aerogenerator and an alternating-current-to-direct-current converter, or may be various kinds of renewable energy generation devices. The direct-current power supply 2 supplies direct-current power to the power conversion device 1.

The alternating-current power system 3 (system 3) is a system that integrates power generation, substation, power transmission and distribution to supply alternating-current power outputted from the power conversion device 1 to power receiving equipment of a consumer, and, for example, an unspecified load is connected to the alternating-current power system 3.

Further, in FIG. 1, the power conversion device 1 has an inverter circuit 10, three-phase alternating-current circuits 20, alternating-current reactors 30, alternating-current switches 40, capacitor circuits 50, alternating-current capacitors 60, current sensors 70, and a control device 80.

The power conversion device 1 has the three-phase alternating-current circuits 20 as output circuits at an alternating-current end (alternating-current side) of the inverter circuit 10, and the three-phase alternating-current circuits 20 are each provided with the alternating-current reactor 30, and the alternating-current switch 40. The three-phase alternating-current circuits 20 each branches into the capacitor circuit 50 between the alternating-current reactor 30 and the alternating-current switch 40. The capacitor circuits 50 are each connected to the alternating-current capacitors 60 via the current sensor 70. The control device 80 is electrically connected to respective elements of the power conversion device 1, although wiring is omitted in the drawing.

The inverter circuit 10 is also referred to as a power conversion circuit, or simply an inverter, and is constructed by a plurality of switching elements such as IGBT (Insulated Gate Bipolar Transistor: insulated gate bipolar transistor). The inverter circuit 10 has an inverter control circuit not illustrated, and the inverter control circuit generates a pulse width modulation signal that is a gate drive signal for a switching element. The inverter circuit 10 is connected to the direct-current power supply 2 at the direct-current end via a direct-current bus, and is connected to the alternating-current reactors 30 at the alternating-current end via the alternating-current circuits 20. The inverter circuit 10 receives the direct-current power supplied from the direct-current power supply 2 from the direct-current end via the direct-current bus, converts the direct-current power into alternating-current power and outputs the alternating-current power from the alternating-current end.

In the alternating-current circuit 20, one end is connected to the alternating-current end of the inverter circuit 10, and the other end is connected to the alternating-current power system 3. The alternating-current circuits 20 in the present embodiment are three-phase alternating-current circuits of a type with three-phases and three-wires, and supply three-phase alternating-current power obtained by combining single-phase alternating-currents of three systems with phases of currents or voltages being shifted from one another, by using three electric wires/cables. Hereinafter, the alternating-current circuits 20 will also be referred to as the "three-phase alternating-current circuits 20".

The alternating-current reactors 30 are also referred to as AC (alternating-current) reactors, and are connected in series to respective phases of the three-phase alternating-current circuits 20 on an output side of the inverter circuit 10. The alternating-current reactors 30 on the output side of the inverter circuit 10 each has an effect of reducing noise and an effect of suppressing a surge voltage. The alternating-current reactor 30 and the alternating-current capacitors 60 described later constitute an LC filter circuit (a filter circuit) connected in an L-shape.

The alternating-current switches 40 are provided in series between the aforementioned LC filter circuits and the alternating-current power system 3 in the respective phases of the three-phase alternating-current circuits 20, and connect or release the alternating-current circuits 20 according to an input instruction or a release instruction from the control device 80 described later or an operator. When the alternating-current switch 40 is released, outflow of the alternating-current power supplied from the inverter circuit 10 to the alternating-current power system 3 is blocked.

The capacitor circuits 50 are circuits in which one ends branch from the respective phases of the three-phase alternating-current circuits 20 between the alternating-current reactors 30 and the alternating-current switches 40, and the other ends are connected to the alternating-current capacitors 60. Note that the capacitor circuit 50 is an example of the LC filter circuit (filter circuit).

The alternating-current capacitor 60 is an electronic component that stores and releases electricity (electric charges) and is also referred to as an AC (alternating-current) capacitor, an AC capacitor (alternating-current capacitor), and a filter capacitor. Hereinafter, the alternating-current capacitor 60 will also be referred to as an "AC capacitor 60". The AC capacitor 60 plays a role of a filter that removes a ripple (vibration) when a switching element not illustrated of the inverter circuit 10 switches and suppresses harmonics (harmonic current) from flowing out to the system 3 side.

In order to increase electrostatic capacitance or satisfy a rated current, the capacitor circuits 50 of the respective phases (a u-phase, a v-phase, and a w-phase) of the three-phase alternating-current circuits 20 are branched into a plurality of numbers, and a plurality of AC capacitors 60 are connected in parallel thereto. The capacitor circuits 50 in the present embodiment are branched into three in each of the phases, and three AC capacitors 60 are connected in parallel in each of the phases, but the number of branches and the number of parallel connections are not limited to three. For example, the capacitor circuit 50 of each of the phases may be branched into five, and five AC capacitors 60 of each of the phases may be connected in parallel. The AC capacitors 60 with three phases may be in one package, and AC capacitor packages 61 may be connected in parallel. Further, in each of the AC capacitor packages 61, the AC capacitors 60 are delta-connected (Δ connection), but may be star-connected (Y connection), or other connection methods may be adopted. Further, the AC capacitors 60 or the AC capacitor packages 61 of different connection methods may coexist and may be connected in parallel.

The AC capacitors 60 each has a safety mechanism 62. The safety mechanism 62 has a function like a fuse that cuts off the AC capacitor 60 from a circuit when an abnormality occurs to the AC capacitor 60, and internal pressure of the AC capacitor 60 rises, for example. The safety mechanism 62 may individually separate the AC capacitor 60 from the circuit or may separate each AC capacitor package 61 from the circuit. Note that the safety mechanism 62 is not limited to the safety mechanism 62 that is disposed for each of the AC capacitors 60 as shown in FIG. 1 and may be disposed for each of the AC capacitor packages 61.

Figure 2:
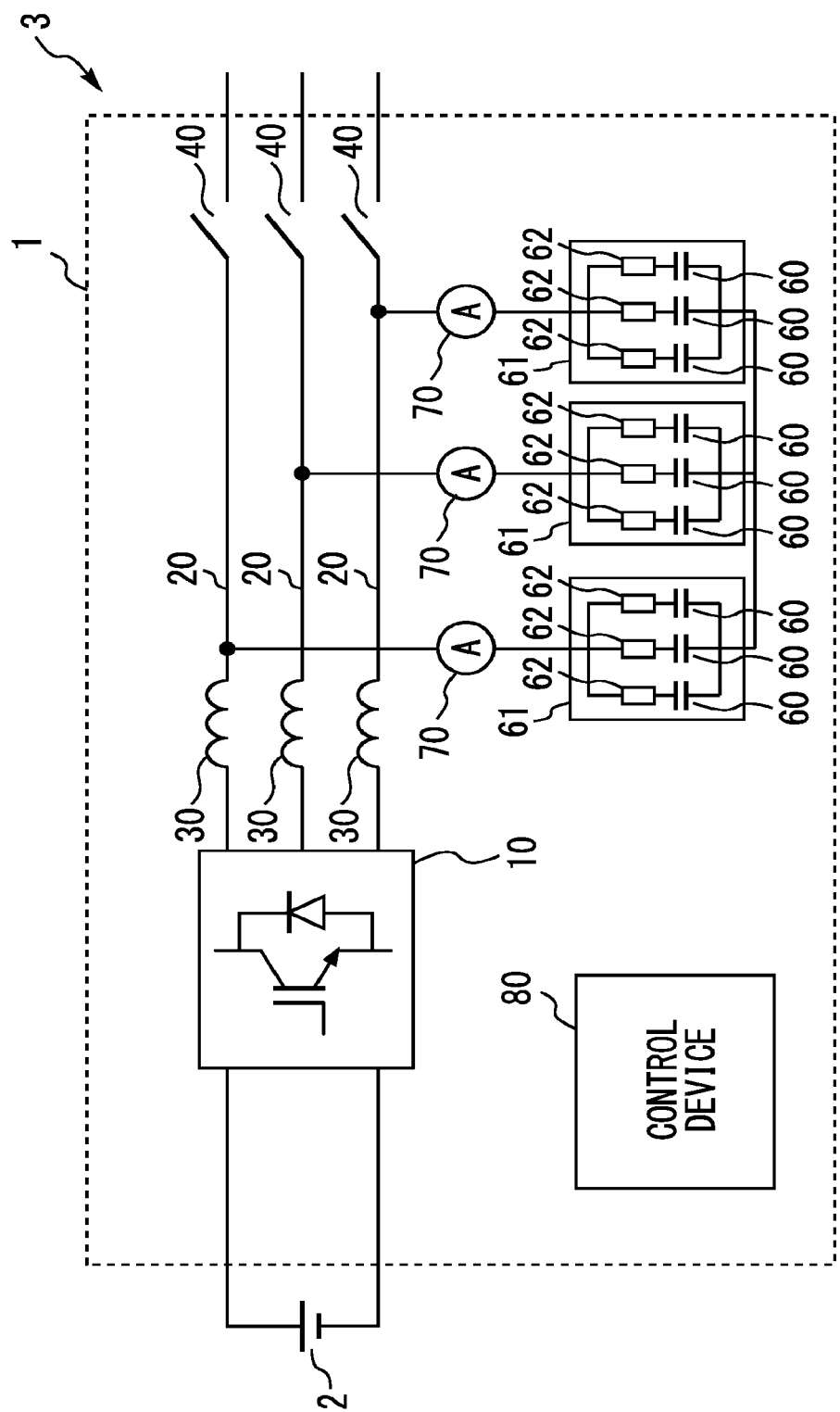
FIG. 2 is a diagram showing an example of another connection method for alternating-current capacitors in the power conversion device shown in FIG. 1.

FIG. 2 is a diagram showing an example of another connection method for the alternating-current capacitor 60 in the power conversion device 1 shown in FIG. 1. In FIG. 2, the same components as those in FIG. 1 will be assigned with the same reference signs as those in FIG. 1, and detailed explanation will be omitted. For the AC capacitors 60, a wire connection method shown in FIG. 2 may be adopted, or a method of the AC capacitor package 61 shown in FIG. 2 may be adopted, for example. In other words, a method of parallel connection of the AC capacitors 60 is not particularly limited. Further, in FIG. 2, positions where the safety mechanisms 62 are disposed are not limited to positions shown in FIG. 2, as in FIG. 1.

Returning to FIG. 1, the current sensors 70 are, for example, sensors of a Hall type, a CT (Current Transformer) type or the like, are disposed in the respective capacitor circuits 50 of the three phases, and measure current values of currents flowing in the respective AC capacitors 60 of the three phases. Note that positions where the current sensors 70 are provided are not limited to positions shown in FIG. 1, and the current sensors 70 may be provided in circuits into which the respective capacitor circuits 50 of the three phases are branched, for example.

Further, as shown in FIG. 8 described later, the current sensors 70 may be provided before and after a branch point where the three-phase alternating-current circuit 20 branches into the capacitor circuit 50. This is because a current value $I_{70}$ that is measured by the current sensor 70 is theoretically equal to a value obtained by subtracting a current value $I_Y$ measured by a current sensor 70Y from a current value $I_X$ measured by a current sensor 70X, as shown in FIG. 8 described later. That is to say, current value $I_{70}$=current value $I_X$−current value $I_Y$ is theoretically established. Accordingly, if a value of the current value $I_X$ and a value of the current value $I_Y$ are known, a value of the current value $I_{70}$ can be obtained theoretically. Accordingly, even if the current sensor 70 is not disposed in each of the capacitor circuits 50 of the three phases, current values of the current flowing in the respective AC capacitors 60 of the three phases can be acquired if only the current sensor 70X and the current sensor 70Y shown in FIG. 8 are disposed in each of the three-phase alternating-current circuits 20.

The control device 80 is, for example, a processor such as a CPU (Central Processing Unit) and a GPU (Graphics Processing Unit) that operates by executing a program, and performs a general control of the operation of the power conversion device 1 in accordance with a predetermined program. The control device 80 is provided inside or outside of the power conversion device 1 and is electrically connected to the respective elements of the power conversion device 1 by wire or wirelessly, although wiring is omitted in the drawing. The control device 80 can acquire measurement values of the current sensors 70, and control operations of the inverter circuit 10 and the alternating-current switches 40, for example.

Figure 3:
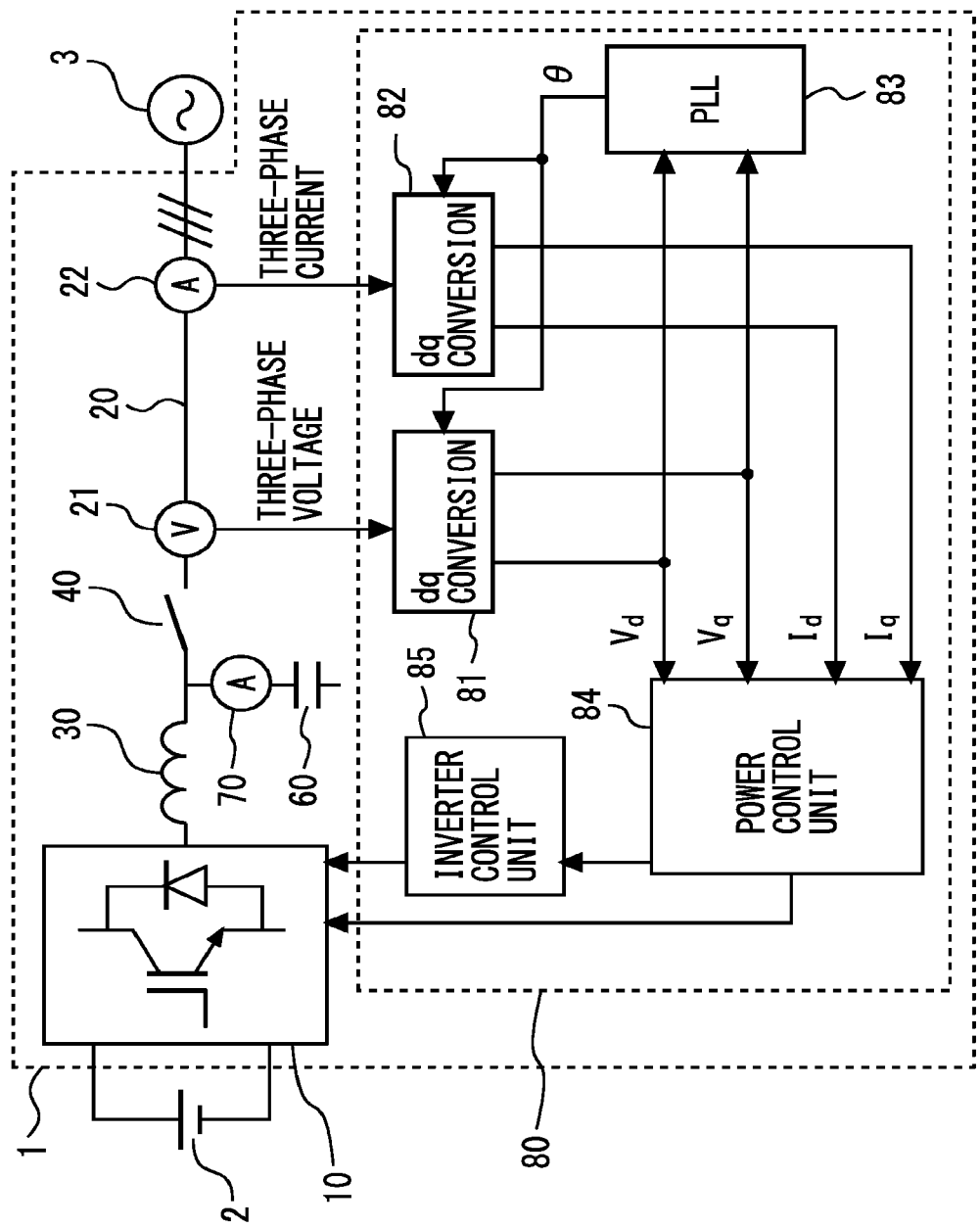
FIG. 3 is a diagram showing an example of an internal configuration of the power conversion device shown in FIG. 1 and FIG. 2.

The control device 80 has functions of a voltage conversion unit 81, a current conversion unit 82, a phase-locked loop 83, a power control unit 84, and an inverter control unit 85 (see FIG. 3). Note that an inverter control circuit not illustrated and owned by the inverter circuit 10 may have some or all of these functions. Note that details of the above described respective functions of the control device 80 will be described later.

FIG. 3 is a diagram showing an example of an internal configuration of the power conversion device 1 shown in FIG. 1 and FIG. 2. In FIG. 3, the same components as those in FIG. 1 and FIG. 2 will be assigned with the same reference signs as those in FIG. 1 and FIG. 2, and detailed explanation will be omitted. Note that in FIG. 3, in reality, alternating-current circuits 20 corresponding to the three phases are connected to an output side of an inverter circuit 10, and alternating-current reactors 30, alternating-current switches 40, AC capacitors 60 and the like corresponding to the three phases are disposed, as shown in FIG. 1 and FIG. 2. Further, in reality, a plurality of AC capacitors 60 are connected to each of the phases in parallel as shown in FIG. 1 and FIG. 2, but for simplification of the drawing, these elements are shown by being simplified.

In FIG. 3, the power conversion device 1 has a voltage sensor 21 and a current sensor 22 in the alternating-current circuit 20 between the alternating-current switch 40 and a system 3. The voltage sensor 21 measures a voltage value V of an output voltage of the inverter circuit 10. The current sensor 22 measures a current value I of a current that is outputted from the inverter circuit 10.

The control device 80 has the functions of the voltage conversion unit 81, the current conversion unit 82, the phase-locked loop 83, the power control unit 84, and the inverter control unit 85, as described above.

The voltage conversion unit 81 acquires the voltage value V from the voltage sensor 21, and acquires a phase command value θ* from the phase-locked loop 83. The voltage conversion unit 81 converts the acquired voltage value V into a dq signal (dq conversion) based on the acquired phase command value θ*, obtains a d-axis voltage value $V_d$ and a q-axis voltage value $V_q$, and outputs the d-axis voltage value $V_d$ and the q-axis voltage value $V_q$ to the power control unit 84. Further, the voltage conversion unit 81 outputs the voltage value V measured by the voltage sensor 21, or the d-axis voltage value $V_d$ and the q-axis voltage value $V_q$ that are dq-converted by the voltage conversion unit 81 to the phase-locked loop 83. Note that dq conversion is three-phase-to-two-phase transformation, that is, a coordinate transformation from the three-phase to the two-phase, and is for expressing a three-phase alternating-current with two axes. Here, in the present embodiment, a d-axis is a same axis as that of the capacitor voltage, and a q-axis is an axis that is shifted in phase by 90 degrees from the capacitor voltage.

The current conversion unit 82 acquires the current value I from the current sensor 22 and acquires the phase command value θ* from the phase-locked loop 83. The current conversion unit 82 performs dq conversion of the acquired current value I based on the acquired phase command value θ*, obtains a d-axis current value $I_d$ and a q-axis current value $I_q$, and outputs the d-axis current value $I_d$ and the q-axis current value $I_q$ to the power control unit 84. Note that as described above, in the present embodiment, the d-axis is a same axis as the capacitor voltage, and the q-axis is an axis that is shifted in phase by 90 degrees from the capacitor voltage. Accordingly, the q-axis current value $I_q$ is a value of a current component of the axis that is shifted in phase by 90 degrees with respect to the capacitor voltage.

The phase-locked loop 83 constitutes a frequency negative feedback circuit. The phase-locked loop 83 is an electronic circuit that adds feedback control based on an inputted periodic signal, and outputs a phase-synchronized signal from a different oscillator. The phase-locked loop 83 acquires the voltage value V, or the d-axis voltage value $V_d$ and the q-axis voltage value $V_q$ from the voltage conversion unit 81. The phase-locked loop 83 performs PLL (Phase Locked Loop) control so that the q-axis voltage value $V_q$ becomes 0 based on the phase θ of the acquired voltage value, and obtains the phase command value θ*. The phase-locked loop 83 outputs the obtained phase command value θ* to the voltage conversion unit 81 and the current conversion unit 82.

The power control unit 84 acquires the d-axis voltage value $V_d$ and the q-axis voltage value $V_q$ from the voltage conversion unit 81, and acquires the d-axis current value $I_d$ and the q-axis current value $I_q$ from the current conversion unit 82. The power control unit 84 is connected to the inverter circuit 10, and generally controls power of the inverter circuit 10 (power conversion device 1) by using the voltage values $V_d$ and $V_q$, the current values $I_d$ and $I_q$ and the like. The power control unit 84 is also connected to the inverter control unit 85, and outputs the voltage values $V_d$ and $V_q$, the current values $I_d$ and $I_q$ and the like to the inverter control unit 85. Note that a configuration of the inverter control unit 85 will be described later.

Figure 4:
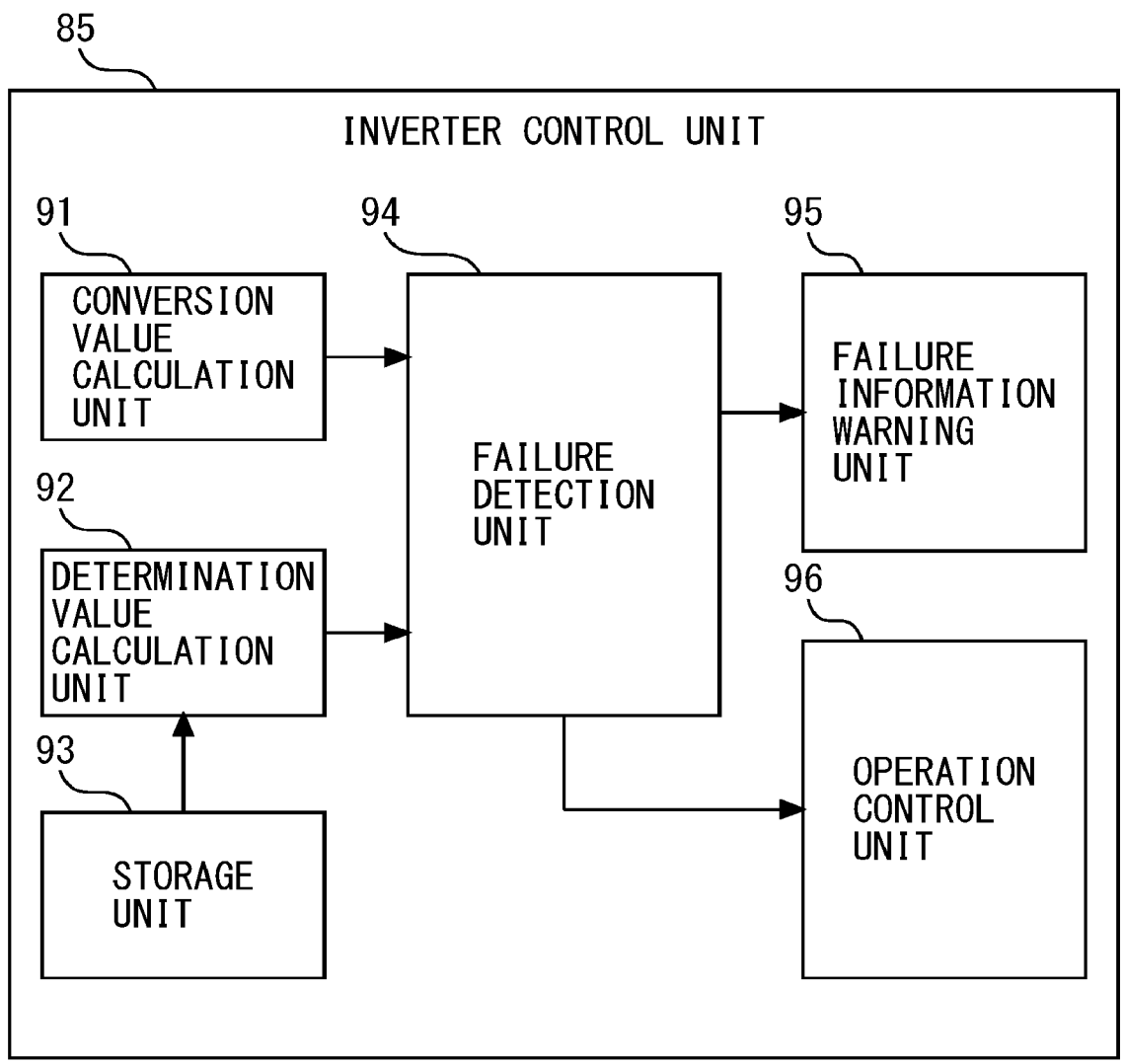
FIG. 4 is a diagram showing a configuration example of an inverter control unit shown in FIG. 3.

FIG. 4 is a diagram showing a configuration example of the inverter control unit 85 shown in FIG. 3. Note that configurations of the power control unit 84 and the inverter control unit 85 in FIG. 3 are only examples, the power control unit 84 may have a function of the inverter control unit 85, or the inverter control unit 85 may have a function of the power control unit 84. Further, the other elements in the control device 80 may have these functions.

The inverter control unit 85 includes functions of a conversion value calculation unit 91, a determination value calculation unit 92, a storage unit 93, a failure detection unit 94, a failure information warning unit 95, and an operation control unit 96. The conversion value calculation unit 91, the determination value calculation unit 92, the failure detection unit 94, the failure information warning unit 95, and the operation control unit 96 execute predetermined programs stored in the storage unit 93, for example, and perform processes as follows.

The conversion value calculation unit 91 acquires current values Iu, Iv and Iw that are measurement values of the current that flows in the AC capacitors 60 of three phases (a u-phase, a v-phase, and a w-phase) from the current sensors 70. The conversion value calculation unit 91 performs dq conversion of the current values Iu, Iv, and Iw by using a predetermined arithmetic program, and obtains conversion values, that is, a d-axis current value $I_{d1}$ and a q-axis current value $I_{q1}$. Note that the q-axis current value $I_{q1}$ is an example of a "conversion value" and a "first q-axis current value" in claims.

The determination value calculation unit 92 acquires the d-axis voltage value $V_d$ that is a measurement value of the output voltage of the inverter circuit 10 from the power control unit 84. The determination value calculation unit 92 acquires a value of a rated conductance of the AC capacitor 60 stored in the storage unit 93. The value of the rated conductance of the AC capacitor 60 is a value of all of the plurality of AC capacitors 60 in a case where all of the plurality of AC capacitors 60 connected in parallel are normal, for example and is a fixed value. The determination value calculation unit 92 obtains a q-axis current value $I'_q$ by multiplying the acquired d-axis voltage value $V_d$ and the acquired value of the rated conductance of the AC capacitor 60, for example. Note that the obtained q-axis current value $I'_q$ is a theoretical value of the q-axis current in the case where all of the AC capacitors 60 are normal.

The determination value calculation unit 92 acquires a value of an abnormality detection level stored in the storage unit 93. Note that the value of the abnormality detection level may be incorporated in advance in the program that is executed by the determination value calculation unit 92. The determination value calculation unit 92 obtains a q-axis current value $I'_{q2}$ that is a determination value, by multiplying the obtained q-axis current value $I'_q$ that is a theoretical value and the value of the abnormality detection level that is acquired or already programmed. Here, the value of the abnormality detection level in the present embodiment is a value smaller than 1, for example, and is 0.8, for example. Note that the q-axis current value $I'_q$ or the q-axis current value $I'_{q2}$ (determination value) may be a predetermined value (predetermined determination value for use in failure detection). In this case, the determination value calculation unit 92 may be omitted. Note that the q-axis current value $I'_{q2}$ is an example of a "determination value" and a "second q-axis current value" in claims.

The storage unit 93 is, for example, a volatile or non-volatile storage medium such as a DRAM (Dynamic Random Access Memory), an HDD (Hard Disk Drive), or an SSD (Solid State Drive). The storage unit 93 stores programs to be executed by the respective units of the control device 80, and writing and reading of various kinds of information are performed thereto by the respective units of the control device 80. The storage unit 93 also stores programs to be executed by the inverter control unit 85 and information, and stores the value of the rated conductance of the AC capacitor 60 and the value of the abnormality detection level that are used in the determination value calculation unit 92, for example. Note that the storage unit 93 may be provided outside of the control device 80 and may be connected to the control device 80 via a wired or wireless network.

The failure detection unit 94 compares the q-axis current value $I_{q1}$ obtained by the conversion value calculation unit 91, and the q-axis current value $I'_{q2}$ obtained by the determination value calculation unit 92, to detect a failure of the AC capacitor 60. In other words, the failure detection unit 94 compares magnitudes of the q-axis current value $I_{q1}$ and the q-axis current value $I'_{q2}$, and when the q-axis current value $I_{q1}$ is smaller than the q-axis current value $I'_{q2}$, determines that the AC capacitor 60 fails and detects the failure of the AC capacitor 60. When detecting the failure of the AC capacitor 60, the failure detection unit 94 outputs failure information to at least either one of the failure information warning unit 95 and the operation control unit 96. Note that the failure detection unit 94 may detect the failure of the AC capacitor 60 by comparing the q-axis current value $I_{q1}$ obtained by the conversion value calculation unit 91 and a predetermined determination value (predetermined determination value for use in failure detection). In this case, the determination value calculation unit 92 may be omitted.

When the failure detection unit 94 detects the failure of the AC capacitor 60, the failure information warning unit 95 acquires the failure information of the AC capacitor 60 from the failure detection unit 94 and, for example, warns an upper device or the like not illustrated of the failure information. In other words, the failure information warning unit 95 issues warning or an alarm to the upper device not illustrated, or a control panel or the like of the power conversion device 1, for example.

When the failure detection unit 94 detects the failure of the AC capacitor 60, the operation control unit 96 acquires the failure information of the AC capacitor 60 from the failure detection unit 94. Subsequently, the operation control unit 96 gives an operation instruction to the power conversion device 1 and the alternating-current switch 40 so as to perform at least either one operation of stop of the power conversion device 1 or release of the alternating-current switch 40.

Operation of One Embodiment

Figure 5:
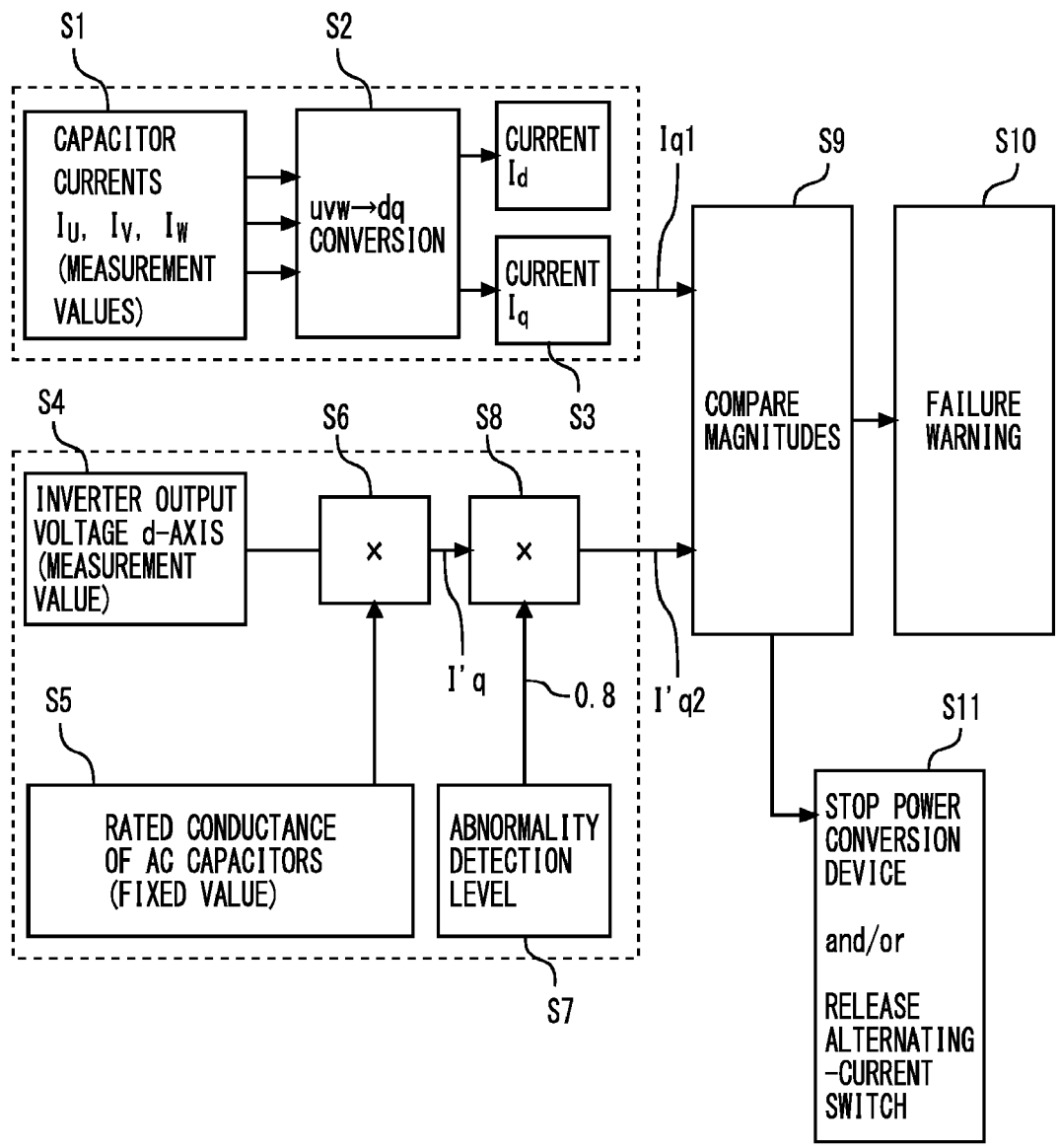
FIG. 5 is a diagram showing an example of a failure detection operation of the control device shown in FIG. 1 to FIG. 4.

FIG. 5 is a diagram showing an example of a failure detection operation of the control device 80 shown in FIG. 1 to FIG. 4. Note that FIG. 5 shows an example of a failure detection operation of the inverter control unit 85 during operation of the power conversion device 1. Here, in the present embodiment, as described above, the d-axis is the same axis as that of the capacitor voltage, and the q-axis is an axis that is shifted in phase by 90 degrees from the capacitor voltage.

In step S1, the conversion value calculation unit 91 acquires the current values Iu, Iv, and Iw that are the measurement values of the current flowing in the AC capacitors 60 of the three phases (the u-phase, the v-phase, and the w-phase) from the current sensors 70. Note that the current sensors 70 always measure the current values Iu, Iv, and Iw, and the conversion value calculation unit 91 always acquires the current values Iu, Iv, and Iw.

In step S2, the conversion value calculation unit 91 performs dq conversion of the current values Iu, Iv, and Iw by using a predetermined arithmetic program, and obtains the d-axis current value $I_{d1}$ and the q-axis current value $I_{q1}$.

In step S3, the conversion value calculation unit 91 outputs the q-axis current value $I_{q1}$ to the failure detection unit 94. Note that when dq conversion is performed so that the q-axis voltage becomes zero, that is, only the d-axis voltage can be seen, the d-axis current value $I_{d1}$ does not change even when the capacitances of the AC capacitors 60 decrease, so that the d-axis current value $I_{d1}$ does not influence detection of the failure of the AC capacitor 60.

Accordingly, the conversion value calculation unit 91 outputs the q-axis current value $I_{q1}$ to the failure detection unit 94.

In step S4, the determination value calculation unit 92 acquires the d-axis voltage value $V_d$ that is the measurement value of the output voltage of the inverter circuit 10 from the power control unit 84.

In step S5, the determination value calculation unit 92 acquires the value of the rated conductance (fixed value) of the AC capacitors 60 that is stored in the storage unit 93.

In step S6, the determination value calculation unit 92 obtains the q-axis current value $I'_q$ that is the theoretical value of the q-axis current by multiplying the acquired d-axis voltage value $V_d$ and the acquired value of the rated conductance of the AC capacitors 60.

In step S7, the determination value calculation unit 92 acquires the value of the abnormality detection level stored in the storage unit 93. Note that in the present embodiment, the value of the abnormality detection level is assumed to be 0.8 hereinafter.

In step S8, the determination value calculation unit 92 obtains the q-axis current value $I'_{q2}$ that is the determination value by multiplying the q-axis current value $I'_q$ that is the theoretical value by 0.8 that is the abnormality detection level.

In step S9, the failure detection unit 94 compares magnitudes of the q-axis current value $I_{q1}$ obtained by the conversion value calculation unit 91 and the q-axis current value $I'_{q2}$ obtained by the determination value calculation unit 92. Subsequently, when the q-axis current value $I_{q1}$ is smaller than the q-axis current value $I'_{q2}$, the failure detection unit 94 determines that the AC capacitor 60 fails and detects the failure of the AC capacitor 60. Note that the failure detection unit 94 may detect the failure by comparing magnitudes of the q-axis current value $I_{q1}$ obtained by the conversion value calculation unit 91 and the predetermined determination value (predetermined determination value for use in failure detection). Subsequently, when detecting the failure of the AC capacitor 60, the failure detection unit 94 outputs failure information to at least either one of the failure information warning unit 95 and the operation control unit 96.

Figure 6A:
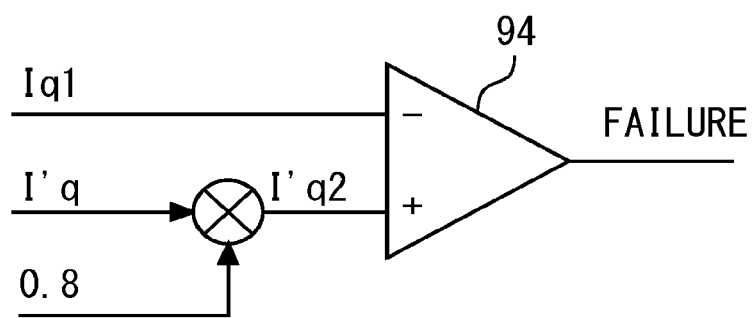
FIG. 6 is a diagram explaining a failure detection logic shown in FIG. 5.
Figure 6B:
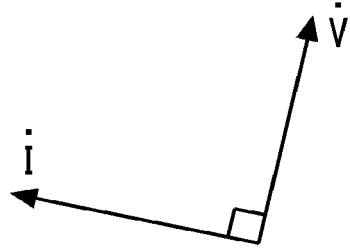

FIG. 6 is a diagram explaining a failure detection logic shown in FIG. 5. In FIG. 6A, a comparator in a center shows the failure detection unit 94. The $I_{q1}$ in an upper left is the q-axis current value $I_{q1}$ obtained in step S3, the $I'_q$ in a left center is the q-axis current value $I'_q$ that is the theoretical value obtained in step S6, and 0.8 in a lower left is the value of the abnormality detection level acquired in step S7. FIG. 6A shows a state where the q-axis current value $I_{q1}$, and a q-axis current value $I'_{q2}$ obtained by multiplying the q-axis current value $I'_q$ that is the theoretical value and 0.8 that is the value of the abnormality detection level are outputted to the failure detection unit 94.

Here, as described above, the value of the abnormality detection level is a value smaller than 1, and is 0.8 in the present embodiment, as an example, When the AC capacitors 60 are normal, the q-axis current value $I_{q1}$ obtained from the current values (measurement values) of the current flowing in the AC capacitors 60, and the q-axis current value $I'_q$ obtained from the voltage value (measurement value) of the output voltage of the inverter circuit 10 should be the same. However, there may be an error, so that in order to allow some error, the determination value calculation unit 92 obtains the q-axis current value $I'_{q2}$ by multiplying the q-axis current value $I'_q$ that is the theoretical value by 0.8 that is the value of the abnormality detection level that is the value smaller than 1. Thereby, even when there is some error, the q-axis current value $I_{q1}$ should be larger than the q-axis current value $I'_{q2}$ that is multiplied by 0.8, when the AC capacitors 60 are normal.

Nevertheless, if the q-axis current value $I_{q1}$ is smaller than the q-axis current value $I'_{q2}$ multiplied by 0.8, it is conceivable that some abnormality occurs to the AC capacitor 60. Accordingly, the failure detection unit 94 compares magnitudes of the q-axis current value $I_{q1}$ and the q-axis current value $I'_{q2}$, and when the q-axis current value $I_{q1}$ is smaller than the q-axis current value $I'_{q2}$, the failure detection unit 94 determines that the AC capacitor 60 fails and detects the failure of the AC capacitor 60.

Explanation using an expression is as follows. A case where the AC capacitor 60 has an open failure will be described as an example. First, the q-axis current value $I'_q$ that is the theoretical value is obtained by expression (1) below.

[Math. 1]

$$I'_q = 2\pi f C V_d \tag{1}$$

Next, the q-axis current value $I_{q1}$, for example, in the case where the three AC capacitors 60 are arranged in parallel and all the AC capacitors 60 are normal is obtained by expression (2) below.

[Math. 2]

$$I_{q1} = 2\pi f C V_d \tag{2}$$

In other words, when $V_d$ is the same, the q-axis current value $I'_q$ obtained by expression (1) and the q-axis current value $I_{q1}$ obtained by expression (2) are same values. Thereby, even if there is some error, the q-axis current value $I_{q1}$ obtained by expression (2) is larger than the q-axis current value $I'_{q2}$ obtained by multiplying the q-axis current value $I'_q$ obtained by expression (1) by 0.8 when the AC capacitors 60 are normal.

Next, for example, when the three AC capacitors 60 are arranged in parallel, and one of the three has an open failure, the q-axis current value $I_{q1}$ is obtained by expression (3) below.

[Math. 3]

$$I_{q1} = 2\pi f \cdot \frac{2}{3} C V_d \tag{3}$$

According to expression (3), the q-axis current value $I_{q1}$ in the case where the AC capacitors 60 are normal is multiplied by $(2/3) \approx 0.67$. Accordingly, the q-axis current value $I_{q1}$ obtained by expression (3) is smaller than the q-axis current value $I'_{q2}$ obtained by multiplying the q-axis current value $I'_q$ obtained by expression (1) by 0.8. Thereby, when the q-axis current value $I_{q1}$ is smaller than the q-axis current value $I'_{q2}$, the failure detection unit 94 determines that the AC capacitor 60 fails and detects the failure of the AC capacitor 60.

Here, why the q-axis current value $I_{q1}$ becomes smaller than the q-axis current value $I'_{q2}$ when an abnormality occurs to the AC capacitor 60 is described with the case where the AC capacitor 60 has an open failure taken as an example. In general, a value of the current flowing in the AC capacitor 60 is expressed by a complex number and is obtained by expression (4) below. Note that FIG. 6B expresses expression (4) by the drawing.

[Math. 4]

$$\dot{I} = j\omega C \dot{V} \tag{4}$$

According to expression (4), when the AC capacitor 60 has an open failure, a capacitance C of the capacitor decreases, so that the current value I also decreases proportionally. Then, the q-axis current value $I_{q1}$ also decreases. Thereby, when the AC capacitor 60 has an open failure, the q-axis current value $I_{q1}$ becomes smaller than the q-axis current value $I'_q$ (q-axis current value $I'_{q2}$). Note that according to expression (4), it is shown that a current that has ωC as a magnitude and advances in phase by 90 degrees flows into the AC capacitor 60, with respect to the phase of the voltage.

Accordingly, the failure detection unit 94 compares the magnitudes of the q-axis current value $I_{q1}$ and the q-axis current value $I'_{q2}$, and when the q-axis current value $I_{q1}$ is smaller than the q-axis current value $I'_{q2}$, the failure detection unit 94 determines that the AC capacitor 60 fails and detects the failure of the AC capacitor 60. When the capacitance C of the AC capacitor 60 decreases, the magnitude of the current also decreases, so that the failure detection unit 94 detects the failure of the AC capacitor 60 by using this characteristic. Further, this also means that the failure detection unit 94 detects the failure of the AC capacitor 60 based on the magnitude of the current component that is advanced in phase by 90 degrees with respect to the phase of the voltage.

Returning to FIG. 5, in step S10, when the failure detection unit 94 detects the failure of the AC capacitor 60, the failure information warning unit 95 acquires the failure information of the AC capacitor 60 from the failure detection unit 94. Subsequently, the failure information warning unit 95 issues failure information such as warning or an alarm to the upper device not illustrated, or the control panel or the like of the power conversion device 1, for example.

Accordingly, it is possible to perform either one of stop of the power conversion device 1 or release of the alternating-current switch 40 or both of them, by human hands, the upper device not illustrated, or software, for example. By doing so, it is possible to suppress spread of the failure to the normal AC capacitors 60 and outflow of harmonics to the system 3 side. Note that priority may be given to stop of the power conversion device 1, out of the stop of the power conversion device 1 or release of the alternating-current switch 40.

Note that the upper device not illustrated generally monitors and controls a plurality of power conversion devices 1, and is connected to the respective power conversion devices 1 by wire or wirelessly.

In step S11, when the failure detection unit 94 detects the failure of the AC capacitor 60, the operation control unit 96 acquires the failure information of the AC capacitor 60 from the failure detection unit 94. Subsequently, the operation control unit 96 gives an operation instruction to the power conversion device 1 and the alternating-current switch 40 so that at least either one operation of stop of the power conversion device 1 or release of the alternating-current switch 40 is performed.

Thereby, either one of stop of the power conversion device 1 or release of the alternating-current switch 40 or both of them is or are performed, and it is possible to suppress spread of the failure to the normal AC capacitors 60 and outflow of the harmonics to the system 3 side. Note that as in step S9 described above, priority may be given to stop of the power conversion device 1, out of the stop of the power conversion device 1 and release of the alternating-current switch 40.

Figure 7A:
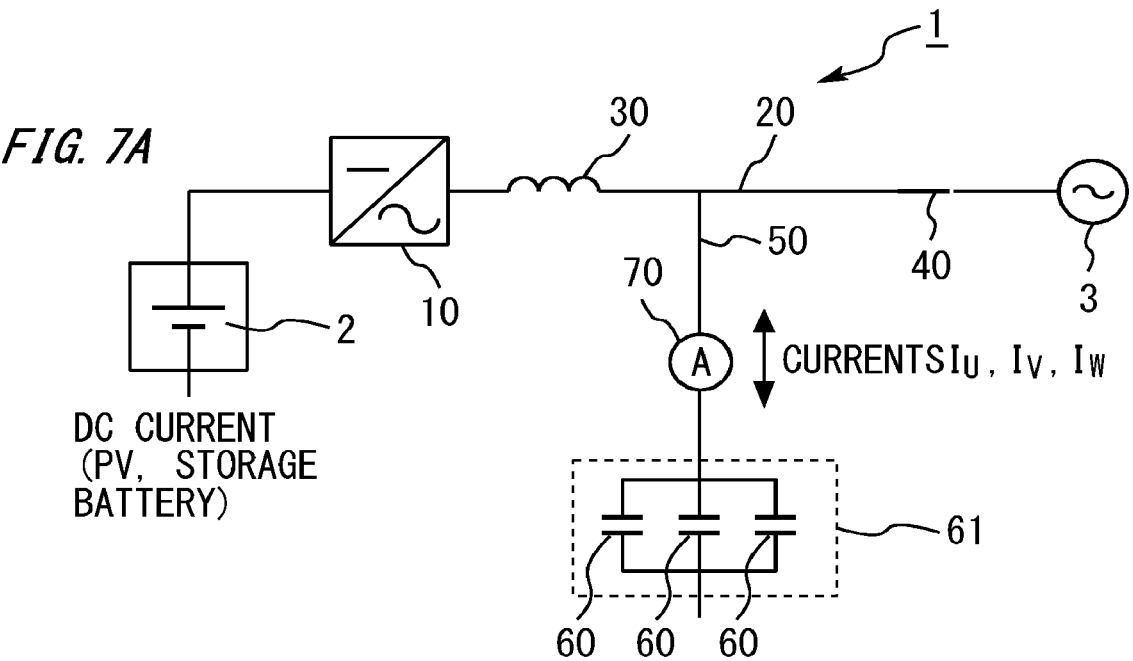
FIG. 7 is a diagram showing an operation example of the power conversion device according to an embodiment shown in FIG. 1 to FIG. 6.
Figure 7B:
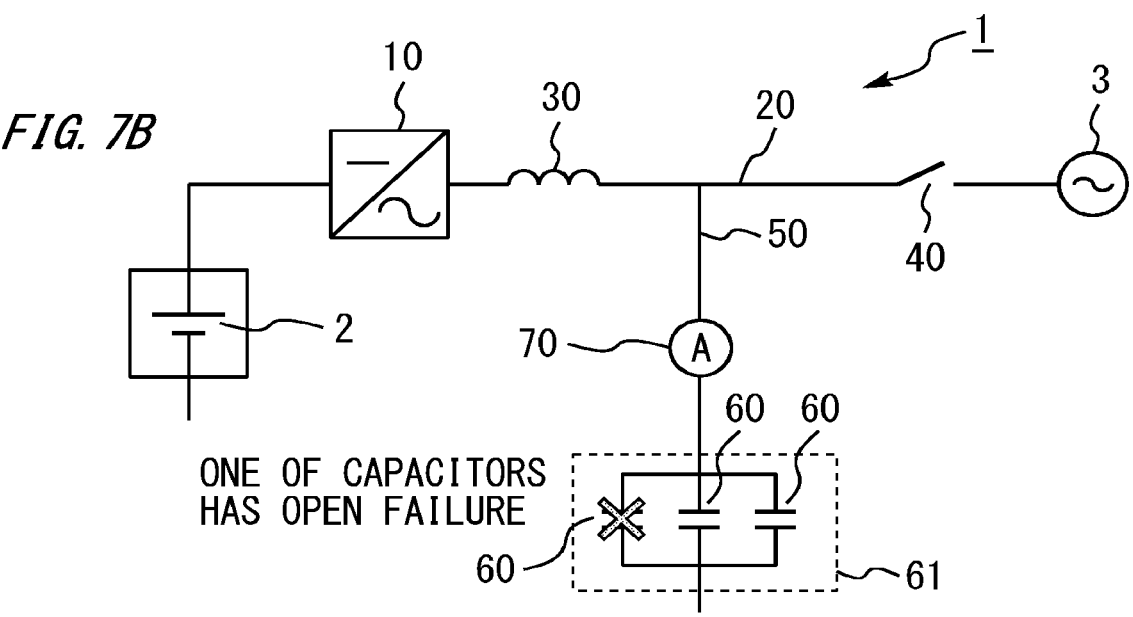

FIG. 7 is a diagram showing an operation example of the power conversion device 1 according to the embodiment shown in FIG. 1 to FIG. 6. FIG. 7A is a diagram showing a state where the power conversion device 1 is under operation, and FIG. 7B is a diagram showing a state where an open failure of the AC capacitor 60 occurs during operation of the power conversion device 1.

Note that in FIG. 7, in reality, the alternating-current circuits 20 corresponding to the three phases are connected to the output side of the inverter circuit 10, and the alternating-current reactors 30, the alternating-current switches 40, the AC capacitors 60 and the like corresponding to the three phases are disposed, as shown in FIG. 1 and FIG. 2. Further, a plurality of AC capacitors 60 are connected in parallel to each of the phases in reality as shown in FIG. 1 and FIG. 2. However, for simplification of the drawing, these elements are shown by being simplified as in FIG. 3.

In FIG. 7A, during operation of the power conversion device 1, the alternating-current switch 40 is turned on. Thereby, the alternating-current power outputted from the inverter circuit 10 flows out to the system 3 side. In the power conversion device 1, the current sensors 70 are provided in the capacitor circuits 50, and always detect the current values Iu, Iv, and Iw of the plurality of AC capacitors of the respective phases that are connected in parallel. The control device 80 always performs operations in step S1 to step S9 shown in FIG. 5.

In FIG. 7B, when an open failure occurs to one of the AC capacitors 60 during operation of the power conversion device 1, the q-axis current value $I_{q1}$ that is obtained from the values of the current values Iu, Iv, and Iw of the plurality of AC capacitors 60 of the respective phases that are connected in parallel becomes smaller than that of a normal time. Accordingly, the control device 80 detects this as an open failure of the AC capacitor 60 in the operation shown in step S9 shown in FIG. 5. When detecting the open failure of the AC capacitor 60, the control device 80 issues failure information by step S10, stops the power conversion device 1 by step S11, releases the alternating-current switches 40, and stops application of the voltage to the AC capacitors 60. As a result, spread of the failure to the normal AC capacitors 60 can be suppressed, and outflow of harmonics to the system 3 side can be suppressed.

Operation Effect of One Embodiment

As above, the embodiment shown in FIG. 1 to FIG. 7 includes the plurality of current sensors 70 each of which measures the current value of the current flowing in the plurality of AC capacitors 60 connected in parallel in the capacitor circuit 50 in each of the phases of the alternating-current circuits 20. Thereby, the control device 80 can also detect a variation of the current value of the current flowing in the AC capacitors 60 during operation of the power conversion device 1, and therefore, can also detect an open failure of the AC capacitor 60 during operation of the power conversion device 1.

Further, in the embodiment shown in FIG. 1 to FIG. 7, in step S8, the determination value calculation unit 92 multiplies the q-axis current value $I'_q$ that is the theoretical value obtained in step S6 by the value of the abnormality detection level acquired in step S7. Thereby, even when there is some error in the current values which the failure detection unit 94 compares, some error can be allowed.

Further, in the embodiment shown in FIG. 1 to FIG. 7, in step S10, the failure information warning unit 95 issues the acquired failure information to the upper device not illustrated when acquiring the failure information of the AC capacitor 60. Thereby, either one of stop of the power conversion device 1 or release of the alternating-current switch 40 or both of them can be performed, by human hands, the upper device not illustrated, or software, for example. By doing so, it is possible to suppress spread of the failure to the normal AC capacitors 60 and outflow of harmonics to the system 3 side.

Further, in the embodiment shown in FIG. 1 to FIG. 7, in step S11, when acquiring the failure information of the AC capacitor 60, the operation control unit 96 gives an operation instruction to the power conversion device 1 and the alternating-current switch 40 so that at least either one operation of stop of the power conversion device 1 or release of the alternating-current switch 40 is performed. Thereby, either one of the stop of the power conversion device 1 or release of the alternating-current switch 40 or both of them is or are performed, and it is possible to suppress spread of the failure to the normal AC capacitors 60 and outflow of the harmonics to the system 3 side.

Modified Example

Figure 8A:
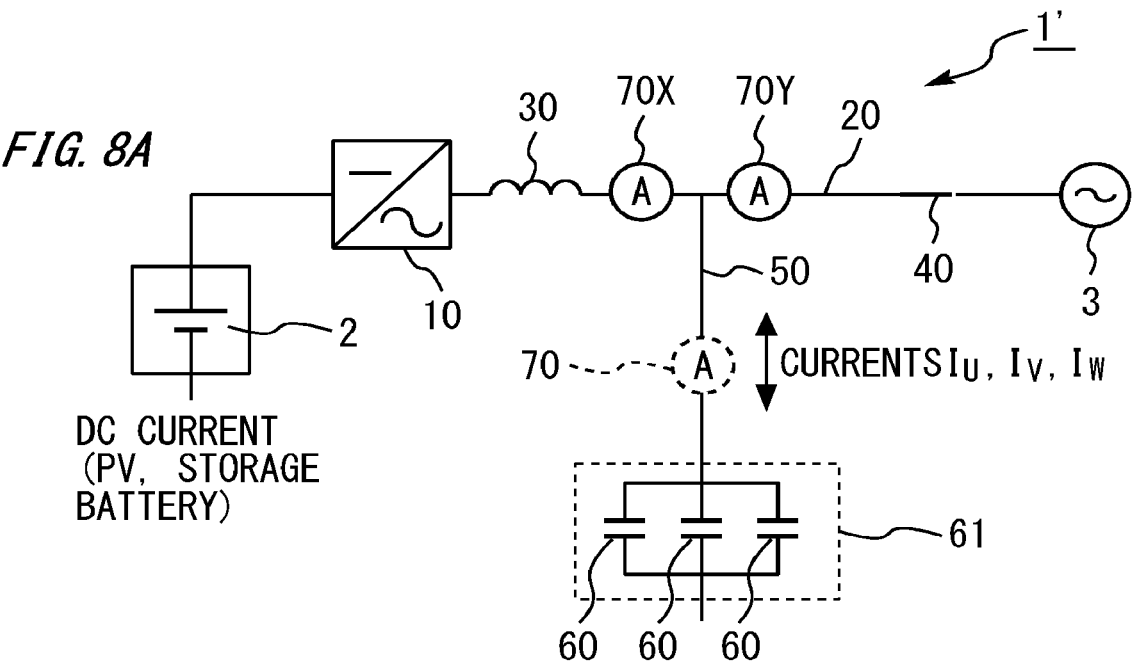
FIG. 8 is a diagram showing another operation example of the power conversion device according to the embodiment shown in FIG. 1 to FIG. 7.
Figure 8B:
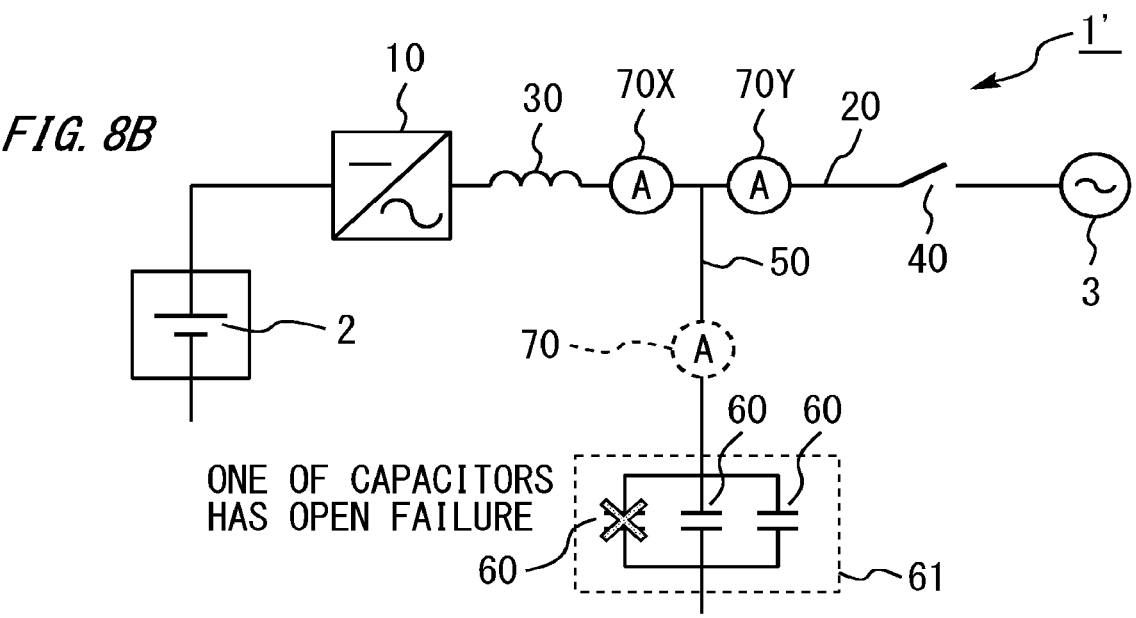

FIG. 8 is a diagram showing an operation example of a power conversion device 1' that is a modified example of the embodiment shown in FIG. 1 to FIG. 7. In FIG. 8, same components as the components in the embodiment shown in FIG. 1 to FIG. 7 are assigned with the same reference sings, and detailed explanation is omitted. Note that in FIG. 8, FIG. 8A shows a state where the power conversion device 1' is under operation, and FIG. 8B shows a state where an open failure of the AC capacitor 60 occurs during operation of the power conversion device 1', as in FIG. 7. Further, in FIG. 8, respective elements are shown by being simplified for simplification of the drawing, as in FIG. 7.

In FIG. 8, in the power conversion device 1', instead of the current sensor 70 provided in the capacitor circuit 50, a current sensor 70X and a current sensor 70Y are provided in a three-phase alternating-current circuit 20. In the three-phase alternating-current circuit 20, the current sensor 70X is provided before a branch point where the three-phase alternating-current circuit 20 branches into the capacitor circuit 50, and the current sensor 70Y is provided after the branch point where the three-phase alternating-current circuit 20 branches into the capacitor circuit 50.

Theoretically, a current value $I_{70}$ measured by the current sensor 70 is equal to a value obtained by subtracting a current value $I_Y$ measured by the current sensor 70Y from a current value $I_X$ measured by the current sensor 70X. In other words, current value $I_{70}$=current value $I_X$−current value $I_Y$ is theoretically established. Accordingly, if a value of the current value $I_X$ and a value of the current value $I_Y$ are known, a value of the current value $I_{70}$ can theoretically be obtained. Consequently, even when the current sensor 70 is not disposed in each of the capacitor circuits 50 of the three phases, if the current sensor 70X and the current sensor 70Y are disposed, in positions shown in FIG. 8, the control device 80 can acquire a current value of the current that flows in each of the AC capacitors 60 of the three phases.

From the above, a same effect as that of the embodiment shown in FIG. 1 to FIG. 7 is also exhibited by the power conversion device 1' shown in FIG. 8, because the control device 80 can theoretically calculate and acquire the current value $I_{70}$ measured by the current sensor 70.

Comparative Example

Figure 9A:
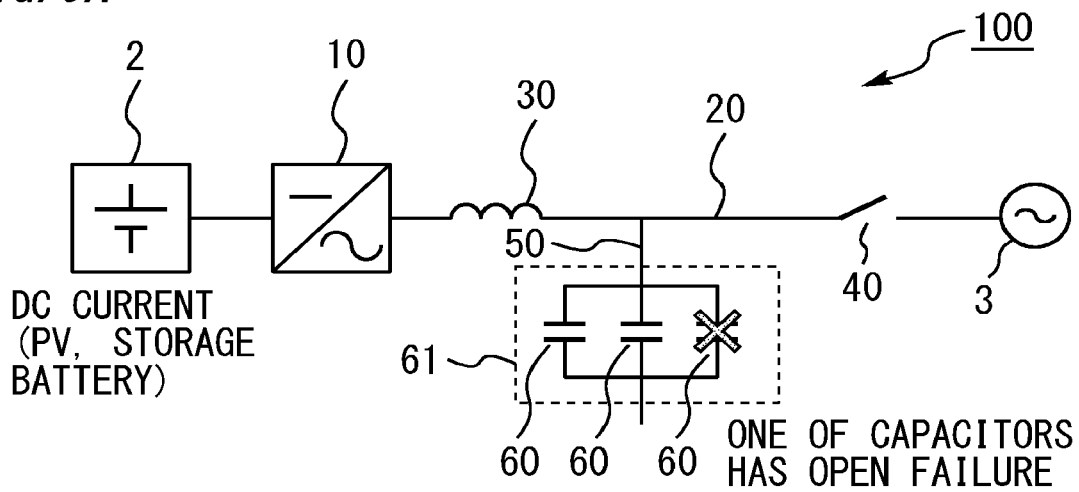
FIG. 9 is a diagram showing an operation example of a power conversion device according to a comparative example.
Figure 9B:
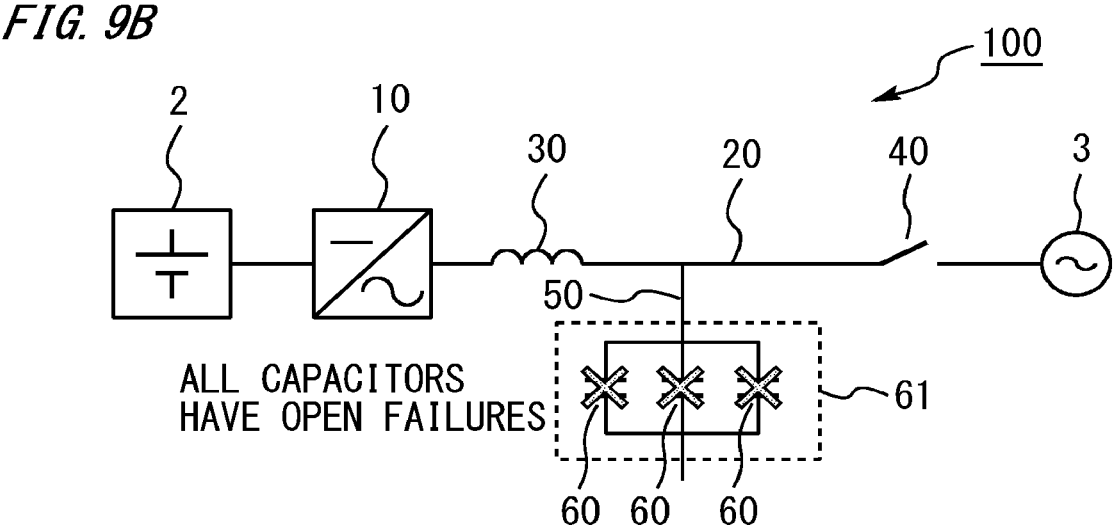

FIG. 9 is a diagram showing an operation example of a power conversion device 100 according to a comparative example. FIG. 9A is a diagram showing a state where an open failure occurs to one of AC capacitors 60 of the power conversion device 100, and FIG. 9B is a diagram showing a state where open failures occur to all the AC capacitors 60. Note that in FIG. 9, same components as those of the embodiment shown in FIG. 1 to FIG. 7 are assigned with same reference signs as those in FIG. 1 to FIG. 7, and detailed explanation is be omitted.

Further, in FIG. 9, in reality, alternating-current circuits 20 corresponding to three phases are connected to an output side of an inverter circuit 10, and alternating-current reactors 30, alternating-current switches 40, AC capacitors 60 and the like corresponding to the three phases are disposed as shown in FIG. 1 and FIG. 2. Further, in reality, a plurality of AC capacitors 60 are connected in parallel to each of the phases as shown in FIG. 1 and FIG. 2. However, these elements are shown by being simplified for simplification of the drawings, as in FIG. 3 and FIG. 7.

In the comparative example shown in FIG. 9, the current sensor 70 is not provided in the capacitor circuit 50, unlike the embodiment shown in FIG. 1 to FIG. 7. Accordingly, the control device 80 cannot grasp the current flowing in the AC capacitors 60.

In FIG. 9A, when an open failure occurs to one of the AC capacitors 60 during operation of the power conversion device 100 according to the comparative example, the control device 80 can detect distortion of a voltage waveform. However, since the current sensor 70 is not provided in the capacitor circuit 50, the control device 80 cannot detect the distortion as the failure of the AC capacitor 60, and therefore continues the operation. Thereby, in the power conversion device 100 according to the comparative example, a load concentrates on the normal AC capacitors 60, and there is a risk that the normal AC capacitors 60 also fail like a domino phenomenon. Further, in the power conversion device 100 according to the comparative example, when a load concentrates on one of the AC capacitors 60 too much, an operation of a safety mechanism 62 cannot keep up, and the AC capacitor 60 (AC capacitor package 61) may explode.

Further, in FIG. 9A, when the power conversion device 100 according to the comparative example is stopping, the control device 80 synchronizes an inverter output voltage of the alternating-current circuit 20 with the voltage of the system 3, and thereafter turns on the alternating-current switch 40 to actuate the power conversion device 100. However, since the control device 80 cannot detect the failure of the AC capacitor 60 in the power conversion device 100 according to the comparative example, so that even when an open failure occurs to one of the AC capacitors 60, the control device 80 can actuate the power conversion device 100. Thereby, in the power conversion device 100 according to the comparative example, there is a risk of spread of the failure to the normal AC capacitors 60 or the like as during the operation.

On the other hand, in the embodiment shown in FIG. 1 to FIG. 7, the current sensor 70 is provided in the capacitor circuit 50. Accordingly, the control device 80 can detect an open failure of the AC capacitor 60 during operation and immediately after actuation of the power conversion device 1 and can suppress spread of the failure to the normal AC capacitors 60 and outflow of the harmonics to the system 3 side. Note that in the modified example shown in FIG. 8, the same effect as that of the embodiment shown in FIG. 1 to FIG. 7 is also exhibited.

When open failures occur to all the AC capacitors 60 during operation of the power conversion device 100 according to the comparative example in FIG. 9B, the voltage waveform is further distorted, so that the control device 80 can detect the distortion of the voltage waveform. However, since the current sensor 70 is not provided in the capacitor circuit 50, the control device 80 cannot detect the distortion as the failures of the AC capacitors 60, and may continue the operation. Accordingly, there is a risk of causing the harmonic current to flow out to the system 3 side in the power conversion device 100 according to the comparative example.

Further, when the power conversion device 100 according to the comparative example is stopping in FIG. 9B, the control device 80 synchronizes the inverter output voltage of the alternating-current circuit 20 with the voltage of the system 3, and thereafter turns on the alternating-current switch 40 to actuate the power conversion device 100. When all the AC capacitors 60 fail, as in the case shown in FIG. 9B, synchronization control of the inverter output voltage and the voltage of the system 3 does operate correctly, and the control device 80 detects the failure of the power conversion device 1 as a "synchronization error". This is because the control device 80 calculates the inverter output voltage with the capacitance of the AC capacitors 60 taken into consideration in software and therefore if all the AC capacitors 60 fail, the calculation does not match.

In other words, since the control device 80 performs power control of the power conversion device 1, the control device 80 knows how much current should be passed to match the inverter output voltage with the voltage of the system 3, given the capacitance of the AC capacitors 60. However, if the AC capacitors 60 fail, a larger amount of current flows, and as a result, the inverter output voltage increases, so that the control device 80 cannot match the inverter output voltage with the voltage of the system 3, and detects the failure of the power conversion device 1 as the "synchronization error".

In this way, in the power conversion device 100 according to the comparative example, the failure of the AC capacitors 60 cannot be detected during operation and can detect the failure for the first time after the voltage is measured at the time of synchronization at the time of actuation. Thereby, in the power conversion device 100 according to the comparative example, there are a risk that the failure spreads to the normal AC capacitors 60 during operation, and a risk that the harmonics to the system 3 side is caused to flow out.

On the other hand, in the embodiment shown in FIG. 1 to FIG. 7, the current sensor 70 is provided in the capacitor circuit 50. Accordingly, the control device 80 cannot detect the open failure of the AC capacitors 60 for the first time at the time of actuation of the power conversion device 1, but can detect the open failure of the AC capacitors 60 immediately even during operation of the power conversion device 1. Consequently, according to the power conversion device 1 according to the embodiment shown in FIG. 1 to FIG. 7, spread of the failure to the normal AC capacitors 60 and outflow of the harmonics to the system 3 side can be suppressed. Note that in the modified example shown in FIG. 8, the same effect as that of the embodiment shown in FIG. 1 to FIG. 7 is also exhibited.

Supplementary Matters of Embodiment

In the embodiment shown in FIG. 1 to FIG. 7, the q-axis current value $I'_q$ is multiplied by a value (0.8) of the abnormality detection level, in step S8 shown in FIG. 5. However, the q-axis current value $I'_q$ may not be multiplied by the value of the abnormality detection level. In other words, the magnitudes of the q-axis current value $I_{q1}$ and the q-axis current value $I'_q$ may be compared. In this case, the "second q-axis current value" in the claim is the q-axis current value $I'_q$ that is the theoretical value. Note that the same applies to the modified example shown in FIG. 8.

Further, in the embodiment shown in FIG. 1 to FIG. 7, the failure detection unit 94 detects a failure of the AC capacitor 60 when some of the AC capacitors have open failures in step S9 shown in FIG. 5. However, when only one of the AC capacitors 60 fails, the failure detection unit 94 may not detect the failure of the AC capacitor 60, but may detect the failure of the AC capacitors 60 when two or more of the AC capacitors 60 fails, for example. Such a method is effective when an influence on the power conversion device 1 is small if only one of the AC capacitors 60 fails, for example. Note that the failure detection unit 94 may detect the failure of the AC capacitors 60 when three or more AC capacitors 60 fail in line with the entity. Note that the same applies to the modified example shown in FIG. 8.

Further, the steps of the processes of the respective units in the embodiment shown in FIG. 1 to FIG. 7 can be implemented as the failure detection method, and a failure detection program that is executed by a computer. Further, the failure detection program can be implemented as a storage medium caused to store the failure detection program. In other words, the failure detection program can be distributed by being recorded, for example, in a removable disk such as a CD (Compact Disc), a DVD (Digital Versatile Disc), or a USB (Universal Serial Bus) memory. Note that the failure detection program may be downloaded from a network via a network interface included in the power conversion device 1, and may be stored in the storage unit 93. Note that the same applies to the modified example shown in FIG. 8.

From the above detailed explanation, the features and advantages of the embodiment will become apparent. This intends that the claims extend to the features and advantages of the embodiment as described above without departing from its spirit and scopes of rights. Further, those who have ordinary knowledge in the technical field should be able to easily conceive of any improvements or changes. Accordingly, the scope of the embodiment having inventiveness is not intended to be limited to what is described above, and it is also possible to relay on suitable improvements and equivalents included within the scope disclosed in the embodiment.

REFERENCE SIGNS LIST 1, 1', 100 Power conversion device
2 Direct-current power supply
3 Alternating-current power system (system)
10 Inverter circuit
20 Alternating-current circuit (three-phase alternating-current circuit)
21 Voltage sensor
22 Current sensor 30 Alternating-current reactor (AC reactor)
40 Alternating-current switch
50 Capacitor circuit
60 Alternating-current capacitor (AC capacitor)
61 AC capacitor package
62 Safety mechanism
70, 70X, 70Y Current sensor
80 Control device
81 Voltage conversion unit
82 Current conversion unit
83 Phase-locked loop
84 Power control unit
85 Inverter control unit
91 Conversion value calculation unit
92 Determination value calculation unit
93 Storage unit
94 Failure detection unit
95 Failure information warning unit
96 Operation control unit
I, $I_{70}$, $I_X$, $I_Y$ Current value
$I_d$, $I_{d1}$ d-axis current value
$I_q$ $I_{q1}$, $I'_q$, $I'_{q2}$ q-axis current value
V Voltage value
$V_d$ d-axis voltage value
$V_q$ q-axis voltage value
θ Phase
θ* Phase command value

The invention claimed is:

1. A control device of a power conversion device, comprising:
  a conversion value calculation circuit that acquires a current value of a current flowing in an alternating-current capacitor connected to a capacitor circuit in an output circuit on an alternating-current side of an inverter circuit and performs conversion of the current value to obtain a conversion value;
  a failure detection circuit that compares the conversion value obtained by the conversion value calculation circuit and a determination value to be used in failure detection to detect a failure of the alternating-current capacitor; and
  determination value calculation circuit that acquires a voltage value of an output voltage of the inverter circuit, and obtains the determination value to be used in failure detection from the voltage value,
  wherein the failure detection circuit compares the conversion value obtained by the conversion value calculation circuit and the determination value obtained by the determination value calculation circuit to detect the failure of the alternating-current capacitor.

2. The control device according to claim 1,
  wherein the determination value is a second q-axis current value that is obtained by the determination value calculation circuit by using a voltage value of an output voltage of the inverter circuit and a value of a rated conductance of the alternating-current capacitors, and is a value of a current component of an axis that is shifted in phase by 90 degrees with respect to a capacitor voltage.

3. The control device according to claim 1,
  wherein the determination value is a value that allows an error based on a value multiplied by a predetermined abnormality detection level.

4. The control device according to claim 1,
  wherein the failure detection circuit compares magnitudes of the conversion value and the determination value, and detects the failure of the alternating-current capacitor when the conversion value is smaller than the determination value.

5. The control device according to claim 1, further comprising:
  a failure information warning circuit that issues failure information to a predetermined upper device when the failure detection circuit detects the failure of the alternating-current capacitor.

6. The control device according to claim 1, further comprising:
  an operation control circuit that gives an operation instruction to perform at least either one operation of stop of the power conversion device or release of an alternating-current switch in the output circuit on the alternating-current side, when the failure detection circuit detects a failure of the alternating-current capacitor.

7. The power conversion device, comprising:
  an inverter circuit that converts a direct-current power supply into an alternating-current power supply;
  alternating-current capacitors connected to capacitor circuits in respective phases of three-phase alternating-current circuits in the three-phase alternating-current circuits on an alternating-current side of the inverter circuit;
  current sensors that acquire current values of currents flowing in the alternating-current capacitors of the respective phases;
  a voltage sensor that acquires a voltage value of an output voltage of the inverter circuit; and
  the control device according to claim 1,
  wherein the conversion value calculation circuit acquires the current values acquired by the current sensors and obtains the conversion values, and
  the determination value calculation circuit acquires the voltage value acquired by the voltage sensor and obtains the determination value.

8. The power conversion device according to claim 7,
  wherein the current sensors are provided in the capacitor circuits branched from the three-phase alternating-current circuits.

9. The power conversion device according to claim 7,
  wherein the current sensors are provided before and after branch points where the three-phase alternating-current circuits branch into the capacitor circuits, in the three-phase alternating-current circuits.

10. The power conversion device according to claim 7,
  wherein a plurality of packages where the alternating-current capacitors are star-connected or delta-connected are connected in parallel.

11. A control device of a power conversion device, comprising:
  a conversion value calculation circuit that acquires a current value of a current flowing in an alternating-current capacitor connected to a capacitor circuit in an output circuit on an alternating-current side of an inverter circuit and performs conversion of the current value to obtain a predetermined conversion value; and
  a failure detection circuit that compares the conversion value obtained by the conversion value calculation circuit and a predetermined determination value to be used in failure detection to detect a failure of the alternating-current capacitor,
  wherein the output circuit on the alternating-current side is three-phase alternating-current circuits, and the conversion value is a first q-axis current value that is obtained by the conversion value calculation circuit by performing dq conversion of the current value of each current of each of phases flowing in a single or a plurality of the alternating-current capacitors in the capacitor circuit in each of the phases of the three-phase alternating-current circuits, and is a value of a current component of an axis shifted in phase by 90 degrees with respect to a capacitor voltage.

12. The control device according to claim 11, wherein the determination value is a value that allows an error based on a value multiplied by a predetermined abnormality detection level.

13. The control device according to claim 11, wherein the failure detection circuit compares magnitudes of the conversion value and the determination value, and detects a failure of the alternating-current capacitor when the conversion value is smaller than the determination value.

14. The control device according to claim 11, further comprising:
a failure information warning circuit that issues failure information to a predetermined upper device when the failure detection circuit detects a failure of the alternating-current capacitor.

15. The control device according to claim 11, further comprising:
an operation control circuit that gives an operation instruction to perform at least either one operation of stop of the power conversion device or release of an alternating-current switch in the output circuit on the alternating-current side, when the failure detection circuit detects a failure of the alternating-current capacitor.

16. The power conversion device, comprising:
an inverter circuit that converts a direct-current power supply into an alternating-current power supply;
alternating-current capacitors connected to capacitor circuits in respective phases of three-phase alternating-current circuits in the three-phase alternating-current circuits on an alternating-current side of the inverter circuit;
current sensors that acquire current values of currents flowing in the alternating-current capacitors of the respective phases;
a voltage sensor that acquires a voltage value of an output voltage of the inverter circuit; and
the control device according to claim 11,
wherein the conversion value calculation circuit acquires the current values acquired by the current sensors and obtains the conversion values, and
the determination value calculation circuit acquires the voltage value acquired by the voltage sensor and obtains the determination value.

17. The power conversion device according to claim 16, wherein the current sensors are provided in the capacitor circuits branched from the three-phase alternating-current circuits.

18. The power conversion device according to claim 16, wherein the current sensors are provided before and after branch points where the three-phase alternating-current circuits branch into the capacitor circuits, in the three-phase alternating-current circuits.

19. The power conversion device according to claim 16, wherein a plurality of packages where the alternating-current capacitors are star-connected or delta-connected are connected in parallel.

* * * * *